(12) United States Patent
Saito et al.

(10) Patent No.: US 6,384,950 B1
(45) Date of Patent: May 7, 2002

(54) OPTICAL SYSTEM FOR SCANNING

(75) Inventors: Kenichi Saito; Chiaki Goto, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/516,150

(22) Filed: Mar. 1, 2000

(30) Foreign Application Priority Data

Mar. 1, 1999 (JP) ............................................. 11-052960

(51) Int. Cl.$^7$ ............................................... G02B 26/08
(52) U.S. Cl. ...................... 359/196; 359/210; 359/216; 359/305
(58) Field of Search ................................ 359/196–226, 359/811, 819, 820, 822, 823, 305; 347/259–261

(56) References Cited

U.S. PATENT DOCUMENTS 5,969,843 A * 10/1999 Naiki et al. .................. 359/216

* cited by examiner

Primary Examiner—James Phan
(74) Attorney, Agent, or Firm—Sughrue Mion, PLLC

(57) ABSTRACT

An optical system for scanning which facilitates, at a time of assembling a plurality of optical elements forming an optical system for scanning, adjustment of positional relationships between the optical elements so that an appropriate laser beam is irradiated. In a light source unit, an SHG module and a collimator lens are assembled on a first base which is formed of covar, and this first base is mounted via an adjustment spacer to a second base at one end thereof in a longitudinal direction. An AOM is mounted to the other end of the second base. In this way, in this light source unit, adjustment of the positional relationships between the optical elements at a time of assembly is facilitated. In addition, regardless of whether an impact is applied at the time of assembly or whether a temperature or the like changes after assembly, an appropriately modulated laser beam can be irradiated.

7 Claims, 8 Drawing Sheets

OPTICAL SYSTEM FOR SCANNING

BACKGROUND OF THE INVENTION

1. Field of the Invention

The present invention relates to an image forming apparatus, and more particularly to an optical system for scanning provided in an image forming apparatus. In the optical system for scanning, light such as a laser beam emitted from a light source is transmitted through an optical element such as a converging lens or an acoustooptic modulation element (i.e., an acoustooptic modulator) so as to form an image on a recording medium.

2. Description of the Related Art

An image exposure device, in which an image is scanned by a laser beam so as to form an image on a photographic printing paper, is used in a digital laboratory system. The image exposure device comprises light sources which emit laser beams of R, G, and B. The laser beams emitted from the respective light sources are modulated based on color image data and are irradiated onto a deflector such as a polygon mirror. Subsequently, the laser beams are deflected in a main scanning-direction by the deflector so as to be irradiated onto the photographic printing paper.

The optical system for scanning provided within the image exposure device includes a polygon mirror, an fθ lens, a cylindrical lens, and the like, together with LDs (laser diodes) or SHG modules. The laser beams are irradiated from the LDs onto the polygon mirror rotating at a high speed. The laser beams irradiated onto the polygon mirror are reflected in the main scanning direction by the polygon mirror and are irradiated onto a recording material such as a photographic printing paper for exposure thereof.

One type of the image exposure device comprises light sources for emitting laser beams of R, G, and B so as to form a color image. Such an image exposure device includes the LDs or SHG modules which emit laser beams having wavelengths corresponding to the respective colors of R, G, and B. A collimator lens for converging the laser beam, an acoustooptic modulation element (AOM) for modulating the laser beam based on image data (density data), and the like are provided for each LD or SHG module.

The laser beams emitted from the LDs or SHG modules are converged by the collimator lenses and enter the AOMs. The AOMs diffract second harmonics of the laser beams at an intensity based on the image data.

In the image exposure device, the laser beams diffracted by the respective AOMs are irradiated onto a point on the polygon mirror. In this way, the laser beams corresponding to the respective colors of R, G, and B are collectively deflected in the main scanning direction so as to expose the recording material.

However, in the optical system for scanning, the respective positions of the optical elements need to be precisely adjusted with respect to the optical axes of the laser beams. In such an optical system for scanning, in addition to adjustment of the positional relationship between the LD and the collimator lens, adjustment of the positional relationship between the collimator lens and the AOM is necessary. When the position of the collimator lens is changed, the positional relationship between the LD and the collimator lens needs to be adjusted again. In order to form a color image, it is necessary to adjust the positional relationship between the LD, the collimator lens, and the AOM for each of the laser beams having the colors of R, G, and B, respectively. Further, the positional relationship between the LD, the collimator lens, and the AOM needs to be adjusted so that the laser beam diffracted by the AOM is irradiated onto a point on the polygon mirror. Therefore, assembly of the optical system for scanning has been very complicated.

Further, changes in the relative positions of the optical elements may be caused by temperature changes, impacts, or the like. Adjustment of the positional relationships between the optical elements is also necessary when such changes in the positions of the optical elements arise.

SUMMARY OF THE INVENTION

In view of the aforementioned facts, an object of the present invention is to provide an optical system for scanning in which assembly of optical elements is improved and the positional relationships between the optical elements can be easily adjusted at the time of scanning and exposing a recording material by modulating a laser beam by an external modulator such as an acoustooptic modulation element.

In order to achieve the above-mentioned object, a first aspect of the present invention is an optical system for scanning in which a laser beam emitted from a laser light source is modulated by an external modulator, which is provided as one of a plurality of optical elements, in accordance with an image to be recorded on a recording medium and is subsequently deflected in a main scanning direction by main scanning deflection means so as to scan and expose the recording medium, the optical system for scanning comprising; a first base member to which at least two optical elements sequentially disposed along an optical axis of the laser beam are mounted after the positional relationship between.them is adjusted; and a second base member to which another optical element, which is disposed adjacent along the optical axis to the optical elements mounted to the first base member, is mounted after the positional relationship between the another optical element and a single optical element is adjusted, the first base member being the single optical element.

In accordance with the aforementioned first aspect of the present invention, at least two optical elements sequentially disposed along the optical axis of the laser beam are mounted to the first base member. Further, the optical elements which have been mounted to the first base member are mounted to the second base member together with the another optical element which is disposed adjacent, along the optical axis, to the optical elements.

In this way, the positional relationships between more than two optical elements can be adjusted by repeatedly adjusting the positional relationships between two optical elements. Consequently, assembly of optical elements, and adjustment of positional relationships at the time of assembly are considerably facilitated compared with a case in which positional relationships between plural optical elements are adjusted and the optical elements are assembled at the same time.

In other words, in the first aspect of the present invention, the positional relationship between the at least two optical elements sequentially disposed is adjusted, and the at least two optical elements are assembled on the first base member. The assembled optical elements are regarded as a single optical element as a whole, and the positional relationship between the single optical element and another optical element disposed at a position proximal to the single optical element is adjusted. Further, the optical elements whose positional relationship has been adjusted and which have been assembled on the second base member in the above-mentioned manner are regarded as a single optical element as a whole, and the positional relationship between the single optical element and next optical element is adjusted. The another optical element and the next optical element may be each formed by a plurality of optical elements whose positional relationships have been adjusted and which have been assembled on a single base plate.

As a result, adjustment of positional relationships between plural elements is much easier in a case in which the respective elements are grouped into (for example, two) groups of elements and the positional relationship between these two groups is repeatedly adjusted, than in a case in which the positional relationships of each of adjacent pairs of single optical elements are respectively adjusted one-by-one in sequential order.

In the present invention having the above structure, an acoustooptic modulation element can be used as the external modulator.

Further, in the present invention, the laser light source, and a converging lens for converging the laser beam emitted from the laser light source may be assembled, as the optical elements, on the first base member. Furthermore, the laser light source may be formed by a solid state laser and a wavelength conversion element.

In this case, the laser light source and the converging lens are mounted to the first base member. These optical elements mounted to the first base member are regarded as a single optical element and are mounted to the second base member together with the acoustooptic modulation element which is the external modulator.

In this way, assembly of the optical elements forming the optical system from the laser light source to the external modulator is facilitated. Further, the optical elements can be assembled in such a manner that the laser beam modulated in accordance with the image data is regarded as the laser beam exiting from a single optical element.

Furthermore, for example, the laser beams of the respective colors of R, G, and B may be regarded as the laser beams exiting from the respective single optical element. Accordingly, even when a color image is formed, adjustment at the time of assembling the light sources is facilitated.

Moreover, in the present invention, the laser light source, and a converging lens for converging the laser beam emitted from the laser light source may be assembled, as the optical elements, on the first base member. Further, the laser light source may be formed by a solid state laser and a wavelength conversion element.

In this way, even when flexure is generated between the first base member and the second base member, if this flexure falls within a predetermined range, modulation or the like of the laser beam can be carried out without the need to adjust the positional relationships of the optical elements.

Further, in the present invention, it is more preferable that a material such as covar having a linear expansion coefficient $\alpha$ of $\alpha < 10^{-5}$ [$K^{-1}$] is used as the first base member.

Even when there are changes in ambient temperature, changes in the positional relationships between the optical elements can be prevented by using, at least for the first base member, a material such as covar (FeNeCo) having a low linear expansion coefficient (thermal expansion rate).

Use of a material having a low linear expansion coefficient is not limited to the first base member. It is more preferable that such a material be used for the second base member as well.

DESCRIPTION OF THE PREFERRED EMBODIMENTS

[First Embodiment]

Figure 1:
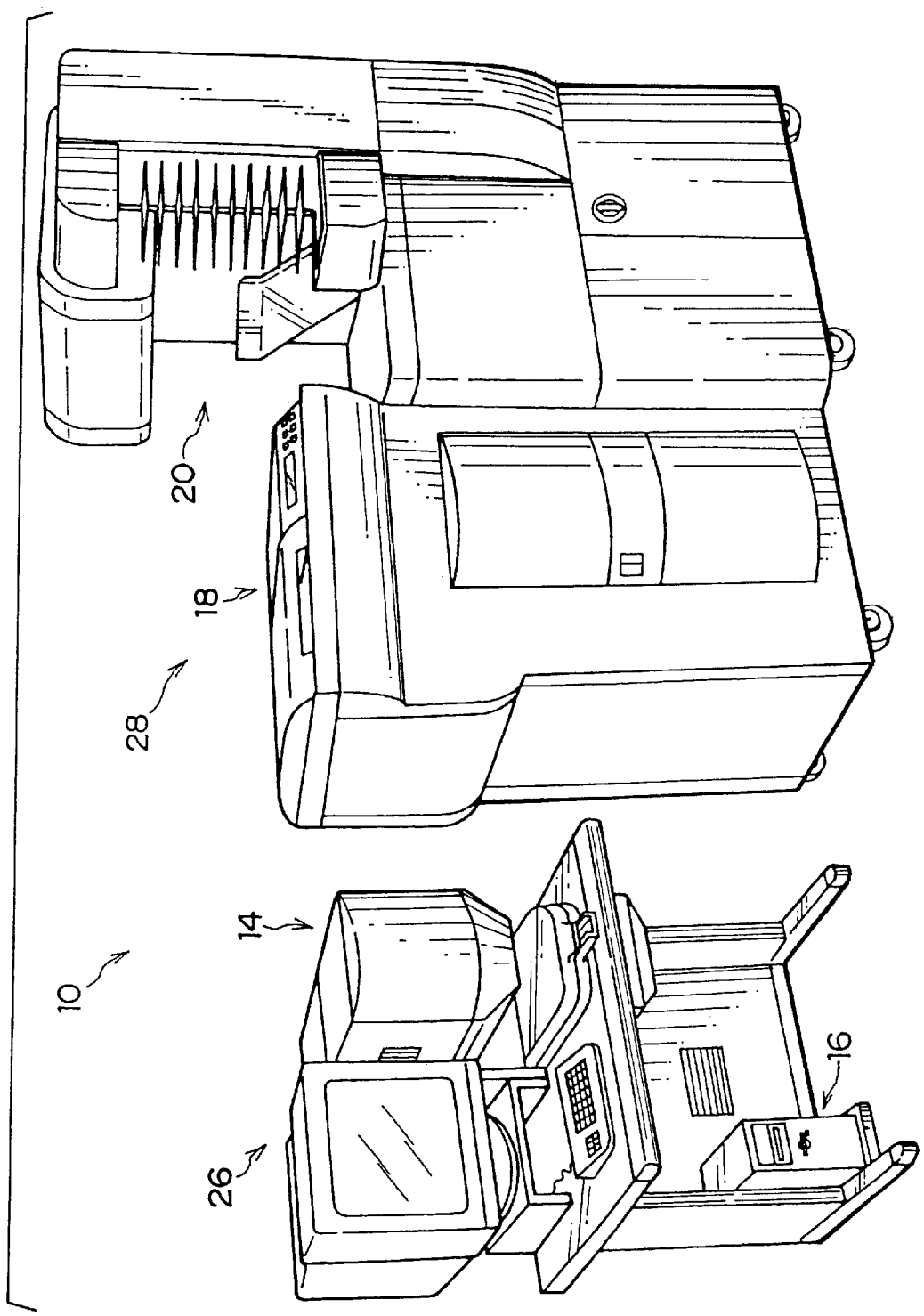
FIG. 1 is a schematic structural view showing a general view of a digital laboratory system in embodiments of the present invention.
Figure 2:
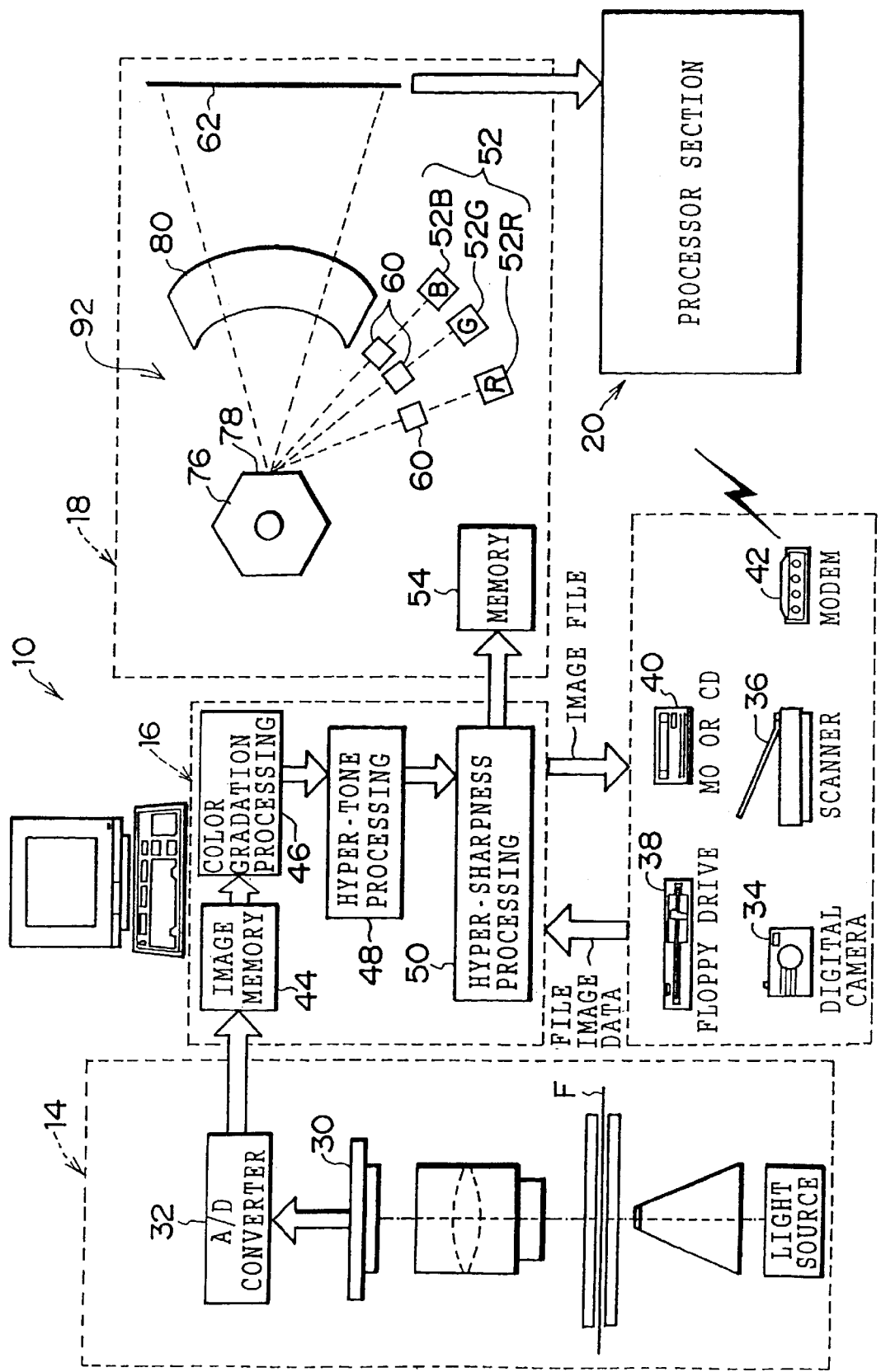
FIG. 2 is a block diagram for main portions, showing the schematic structure of the digital laboratory system.

A schematic structure of a digital laboratory system 10 relating to the present embodiment is shown in FIGS. 1 and 2.

As shown in FIG. 1, the digital laboratory system 10 comprises a linear CCD scanner 14, an image processing section 16, a laser printer section 18, and a processor section 20. The linear CCD scanner 14 and the image processing section 16 are integrated to form an input section 26, while the laser printer section 18 and the processor section 20 are integrated to form an output section 28

As shown in FIG. 2, the linear CCD scanner 14 comprises a linear CCD 30. Frame images recorded on a photographic film F such as a negative film, a reversal film, or the like are read by the linear CCD 30. Examples of the photographic film F on which a frame image to be read is recorded include 135-size photographic films, 110-size photographic films, photographic film with a transparent magnetic layer formed thereon (i.e., 240-size photographic films which are APS films), and 120-size and 220-size (Brownie size) photographic films.

The linear CCD scanner 14 reads the aforementioned frame image to be read and outputs image data, which has been subjected to analog-to-digital conversion at an analog-to-digital converter 32, to the image processing section 16.

The image data (i.e., the scanned image data) outputted from the linear CCD scanner 14 is inputted to the image processing section 16. Further, image data from the outside, such as image data obtained by photographing using a digital camera, image data obtained by reading an original (such as a reflection original) using a scanner 36 (a flat bed type), image data generated by other computers and read from a floppy disk drive 38, a magneto-optical disk (MO) drive or a CD drive 40, and image data received through communication via a modem 42 or the like (i.e., file image data), can also be inputted to the image processing section 16.

The image processing section 16 stores the inputted image data in an image memory 44, effects image processings including various corrections for the inputted image data at a color gradation processing portion 46, a hyper-tone processing portion 48, a hyper-sharpness processing portion 50, and the like. The image processing section 16 then outputs the corrected image data, as image data for recording, to the laser printer section 18. The image processing section 16 can also output the image data subjected to image processing so that the image data is stored in a recording medium such as a FD, an MO, or a CD, or is transmitted via a communication line to other information processing equipment.

The laser printer section 18 includes laser light sources 52R, 52G, and 52B for lasers of R, G, and B, respectively (hereinafter generically referred to as the "laser light sources 52" when necessary). The laser beams emitted from the laser light sources 52 are modified in accordance with the image data for recording which has been inputted from the image processing section 16, and the modified laser beams scan and expose a photographic printing paper 62. As a result, an image in accordance with the image data is recorded on the photographic printing paper 62.

The processor section 20 effects various processings such as color formation, bleach-fixing, washing, and drying for the photographic printing paper 62 with an image recorded thereon. In this way, an image is formed on the photographic printing paper 62, and a photographic print in accordance with the image data is thereby obtained.

Figure 3:
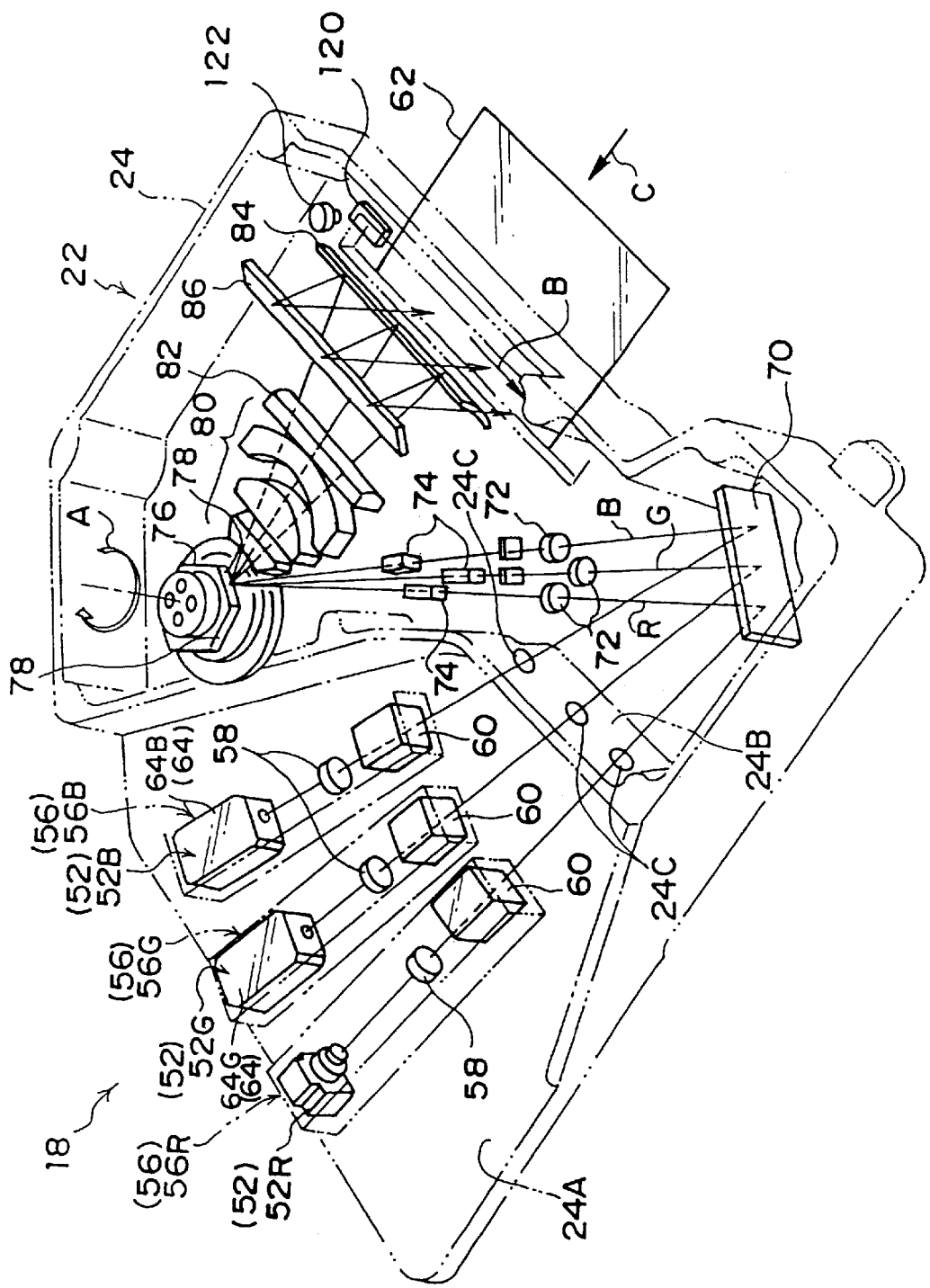
FIG. 3 is a perspective view for main portions, showing the schematic structure of a main scanning optical unit.

FIG. 3 shows a main scanning optical unit 22 provided, as an optical system for scanning, at the laser printer section 18. The main scanning optical unit 22 comprises, within a casing 24, light source units 56R, 56G, and 56B which have the laser light sources 52R, 52G, and 52B for emitting laser beams of R, G, and B, respectively (hereinafter generically referred to as the "light source units 56" when necessary).

A semiconductor laser (LD) which emits a laser beam having a wavelength of R (e.g., 680 nm) is provided at the laser light source 52R. Further, the laser light source 52G has a solid state laser and an SHG module 64G. The laser light source 52B has a solid state laser and an SHG module 64B. (Hereinafter, these SHG modules are referred to as the "SHG module 64" or "SHG modules 64" when it is not particularly necessary to distinguish a particular module.) The SHG modules 64G and 64B each include a wavelength conversion element (SHG), and these wavelength conversion elements are formed by waveguides which convert laser beams emitted from the solid state laser to laser beams whose wavelengths are one-half of the wavelengths of the original laser beams. Oscillation a wavelength of the solid state lasers are set so that the SHG module 64G emits a laser beam having a wavelength of G (e.g., 532 nm) and the SHG module 64B emits a laser beam having a wavelength of B (e.g., 475 nm).

A collimator lens 58 and an acoustooptic modulator 60 (hereinafter referred to as the "AOM 60") are sequentially disposed at a laser beam exit side of each of the laser light sources 52R, 52G, and 52B. Each AOM 60 has a general structure comprising an acoustooptic modulation medium through which an incident laser beam passes, and a transducer generating ultrasonic waves (neither of these are shown). In this structure, when a predetermined high frequency signal is inputted to the transducer, an ultrasonic wave is generated by the transducer and is propagated through the acoustooptic modulation medium. The laser beams emitted from the laser light sources 52R, 52G, and 52B and transmitted through the respective collimator lenses 58 are diffracted by the ultrasonic wave when passing through the AOMs 60.

Within the casing 24 of the main scanning optical unit 22, a polygon mirror (PLG) 76 is provided as a main scanning deflecting means, in addition to a plane mirror 70, beam expanders 72 and cylindrical lenses 74. The laser beams emitted from the respective AOMs 60 are reflected by the plane mirror 70 and are made parallel to each other by the beam expanders 72. Subsequently, the laser beams are converged in lines by the cylindrical lenses 74 and are irradiated onto a deflecting and reflecting surface 78 of the polygon mirror 76 substantially at the same position. At this time, the laser beams are deflected and reflected in the main scanning direction by the polygon mirror 76 being rotated at a high speed, and scanning by the laser beams is carried out in the main scanning direction at a predetermined scanning speed.

In a case in which fixed lasers are used as the LDs emitting the laser beams of G and B, an ND filter is preferably provided on the optical path between the beam expander 72 and the cylindrical lens 74 so as to slightly deflect the laser beam (e.g., about 0.5°) and prevent the reflected laser beam from returning to the LD and being oscillated. Further, a wedge-shaped ND filter may be used to adjust the deflection angle of the laser beam.

At the side where the laser beams are reflected by the polygon mirror 76, an fθ lens 80 for correcting the scanning speed on the exposed surface, a cylindrical lens 82 for optical compensation for the polygon pyramid error having a power in a sub-scanning direction, and a cylindrical mirror 84 are disposed in that order. Moreover, a reflecting mirror 86 is disposed at the laser beam exit side of the cylindrical mirror 84.

The laser beams deflected and reflected in the main scanning direction by the polygon mirror 76 are transmitted through the fθ lens 80 and then the cylindrical lens 82. Subsequently, the laser beams are reflected by the cylindrical mirror 84 toward the reflecting mirror 86, which in turn reflects the laser beams toward the photographic printing paper 62. In this way, the laser beams are irradiated onto the photographic, printing paper 62 while main scanning is carried out by the laser beams.

In FIG. 3, the direction in which the polygon mirror 76 is rotated, the main scanning direction of the laser beams, and the direction in which the photographic printing paper 62 is conveyed (i.e., the sub-scanning direction) are indicated by arrows A, B, and C, respectively. Further, the reflecting mirror 86 may be omitted, and the laser beams may be reflected by the cylindrical mirror 84 toward the photographic printing paper 62.

Figure 4:
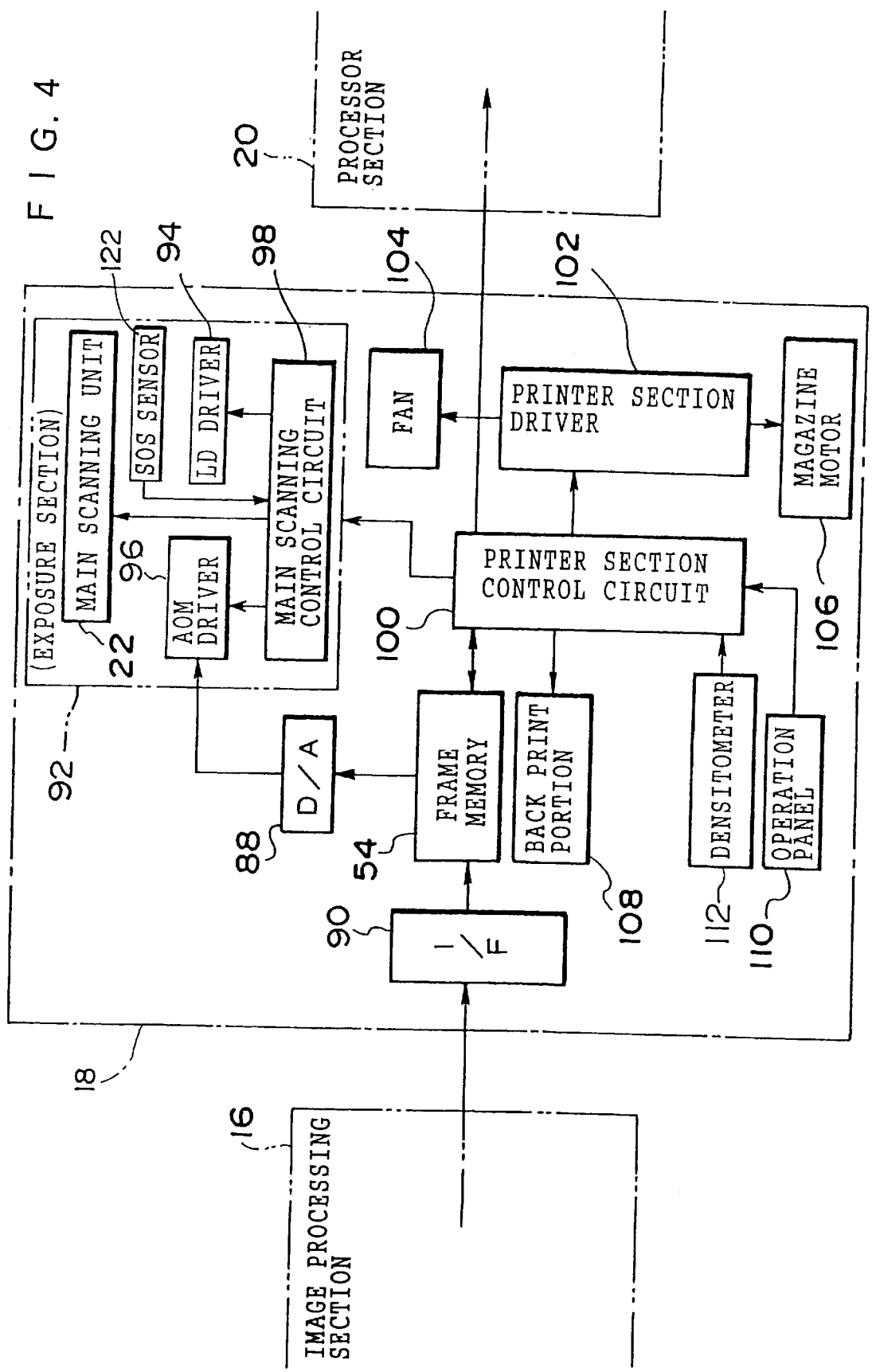
FIG. 4 is a block diagram schematically showing the structure of a laser printer section at which the main scanning optical unit is provided.

FIG. 4 schematically shows the structure of an electric system of the laser printer section 18. The laser printer section 18 includes a frame memory 54 which stores image data for recording. Image data inputted via an I/F circuit 90 from the image processing section 16 (i.e., data representing densities of R, G, and B for each of pixels of an image to be recorded on the photographic printing paper 62) is temporarily stored in the frame memory 54. The image data stored in the frame memory 54 is outputted via a D/A converter 88 to an exposure section 92 where the main scanning optical unit 22 is provided.

The exposure section 92 includes the main scanning optical unit 22 in which the polygon mirror 76 is provided, an LD driver 94 for driving the respective LDs for the laser light sources 52 of the respective colors, and an AOM driver 96 for driving the AOMs 60. The exposure section 92 also includes a main scanning control circuit 98 for controlling the optical unit 22, the LD driver 94 and the AOM driver 96.

Moreover, as shown in FIG. 3, the exposure section 92 includes a reflecting mirror 120 and an SOS sensor 122 between the reflecting mirror 86 and the conveying path of the photographic printing paper 62. In a case in which the laser beams carrying out main scanning outside the image recording area of the photographic printing paper 62 are irradiated onto the surface of the reflecting mirror 120, the reflecting mirror 120 reflects the laser beams toward the SOS sensor 122.

As shown in FIG. 4, the SOS sensor 122 is connected to the main scanning control circuit 98. The main scanning control circuit 98 determines when exposure of the photographic printing paper 62 is to be initiated from the results of detection by the SOS sensor 122.

The main scanning control circuit 98 is in turn connected to a printer section control circuit 100 which includes an unillustrated microcomputer. The main scanning control circuit 98 carries out main scanning by the laser beams by controlling the laser light sources 52, the AOMs 60, an unillustrated motor which drives the polygon mirror 76 provided in the main scanning unit 22, and the like, based on control signals from the printer section control circuit 100.

At this time, a high-frequency signal in accordance with the image data is inputted from the AOM driver 96 to the AOMs 60 corresponding to the respective colors of R, G, and B. The laser beams passing through the AOMs 60 are diffracted by this input, and the laser beams exit from the respective AOMs 60 as diffracted lights having an intensity modulated in accordance with the amplitude of the high-frequency signals. Namely, the laser beams diffracted in accordance with the image data exit from the AOMs 60, and an image is formed in accordance with the image data by the laser beams exposing the photographic printing paper 62.

Also connected to the printer section control circuit 100 are a fan motor 104 for pressurizing the inside of the casing 24, and a magazine motor 106 for pulling the photographic printing paper 62 out of a magazine loaded in the laser printer section 18. The fan motor 104 and the magazine motor 106 are connected via a printer section driver 102 to the printer section control circuit 100. Further, a back print portion 108 for printing characters and the like on the back side of the photographic printing paper 62, and an operation panel 110 which an operator uses to effect various printing instructions are connected to the printer section control circuit 100. Exposure processing is carried out for the photographic printing paper 62 by controlling the operations of the fan motor 104, the magazine motor 106, the back print portion 108 and the operation panel 110 in accordance with the operation of the exposure section 92.

Further, a densitometer 112 for measuring a density of the image on the photographic printing paper 62 which has been subjected to developing processing at the processor section 20, and an unillustrated processor section control circuit provided in the processor section 20 are connected to the printer section control circuit 100. The laser printer section 18 and the processor section 20 are operated synchronously so that the photographic printing paper 62 whose image has been formed at the laser printer section 18 is sequentially processed at the processor section 20.

As shown in FIG. 3, a flat plate-shaped base portion 24A is provided so as to be formed integrally with and extend beyond the casing 24. Optical elements structuring the main scanning optical unit 22 are attached to the casing 24. The light source units 56R, 56G, and 56B are disposed on the base portion 24A. The laser beams respectively emitted from the light source units 56R, 56G, and 56B enter the inside of the casing 24 through holes 24C formed in a wall 24B of the casing 24 and reach the plane mirror 70.

Figure 5:
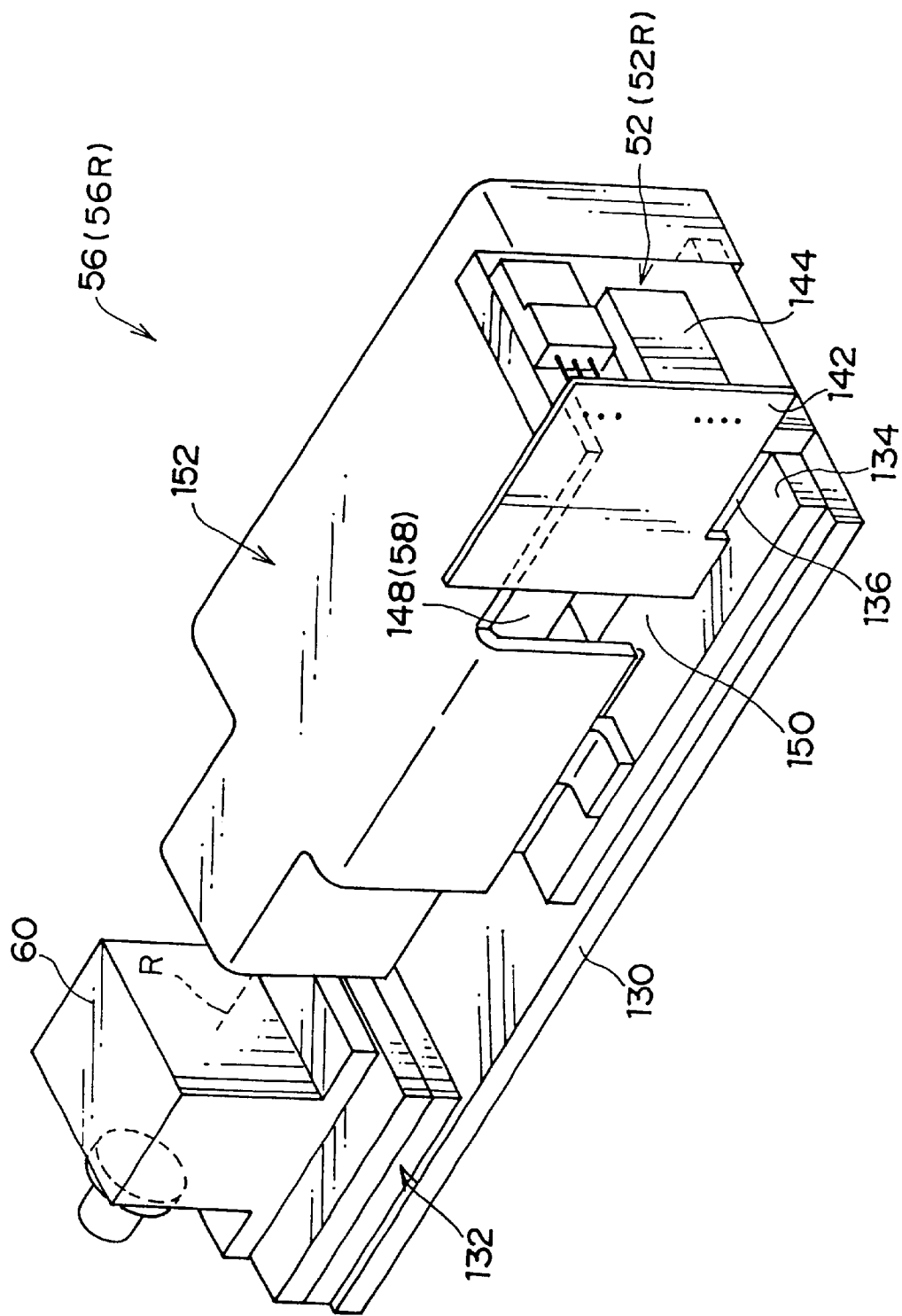
FIG. 5 is a perspective view schematically showing the structure of a light source unit relating to a first embodiment.
Figure 6:
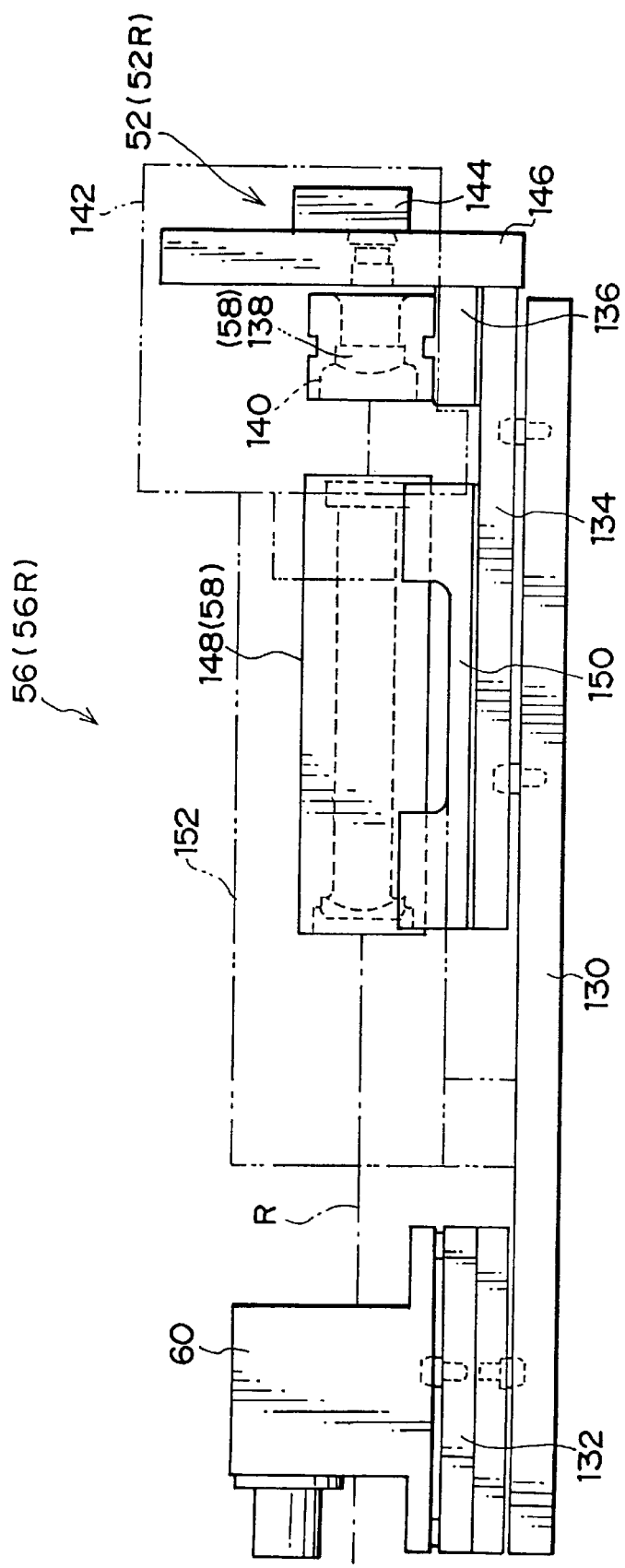
FIG. 6 is a schematic structural view of the light source unit relating to the first embodiment seen from a direction orthogonal to the optical axis of a laser beam.

One of the light source units 56 used in the main scanning optical unit 22 is shown in FIGS. 5 and 6. The light source units 56R, 56G, and 56B have substantially the same structure for assembling the optical elements. Hereinafter, the light source unit 56R will be described as an example.

The light source unit 56R includes an elongate, flat plate-shaped base 130. The AOM 60 is disposed at one end portion of the base 130 in the longitudinal direction thereof, and is mounted via a mount 132 to the base 130. The light source unit 56R is mounted in such a way that the base 130 is positioned on the base portion 24A of the casing 24 (not shown in FIG. 5).

A base 134 in a substantially rectangular and flat plate shape is mounted to the other end portion of the base 130. A mount 136 is mounted to the base 134 at an end portion opposite to the AOM 60. As shown in FIG. 6, a lens 138 forming the collimator lens 58 is disposed at the side of the mount 136 toward the AOM 60. The lens 138 is mounted via a holder 140 to the mount 136.

Further, as shown in FIGS. 5 and 6, the laser light source 52R is disposed on the mount 136 at an end portion opposite to the AOM 60. An LD 144 emitting a laser beam is provided at the laser light source 52R at a base plate 142. The base plate 142 is positioned on and mounted to the mount 136 via a supporting plate 146.

As shown in FIG. 6, the LD 144 emits a laser beam toward the lens 138. The laser beam emitted from the LD 144 is converged by the lens 138 forming a portion of the collimator lens 58.

On the other hand, a collimator 148 forming the collimator lens 58 together with the lens 138 is disposed on the base 134 at the side closer to the AOM 60 than the lens 138. The collimator 148 is formed in a cylindrical shape. The axial direction of the collimator 148 is disposed along the optical axis of the laser beam emitted from the laser light source 52R. The collimator 148 is positioned on and mounted to the base 134 via amount 150.

The laser beam, which has been emitted from the LD 144 and has passed through the lens 138 enters the AOM 60. The laser beam is diffracted by the AOM 60 and exits therefrom.

The bases 130 and 134, the mount 136, and the like on which the optical elements forming the laser light source 52R, the collimator lens 58 and the AOM 60 are mounted are preferably formed of a material having a low thermal expansion rate. In the light source unit 56, in particular, the base 134 and the mount 136 are formed of a material having a low linear expansion coefficient (thermal expansion rate). In this way, even when there are changes in temperature or the like, changes in the positional relationship, along the direction of the optical axis, between the optical elements mounted to the mount 136 or the base 134 can be prevented.

Although these optical elements can be fixed by using any mechanism which can adjust the positional relationships between the optical elements, the detailed description of the mechanism is omitted in the present embodiment. A cover 152 is provided for the light source unit 56R so as to cover the optical path of the laser beam from the surrounding of the mount 136 to the vicinity of the AOM 60. Air flow in the vicinity of the collimator lens 58 (between the lens 138 and the collimator 148, and between the collimator 148 and the AOM 60) can be prevented by the cover 152. Moreover, fluctuation of the laser beam caused by air flow when the magnification of the collimator lens 58 is increased is prevented by the cover 152.

Operation of the first embodiment will be described below.

In the digital laboratory system 10 used in the present embodiment, when an image recorded on a photographic film or the like is read by the linear CCD scanner 14 as image data, the image data is outputted to an image processing section 16. In the image processing section 16, the image data read by the linear CCD scanner 14 is subjected to predetermined image processings and is outputted to the laser printer section 18 as image data for recording to be recorded on the photographic printing paper 62.

After the image data inputted from the image processing section 16 is stored in the frame memory 54, the laser printer section 18 controls the exposure section 92 and the like based on the image data stored in the frame memory 54, scans and exposes the photographic printing paper 62 in accordance with the image data, and forms an image on the photographic printing paper 62 in accordance with the image data.

The photographic printing paper 62 which has been subjected to exposure is conveyed from the laser printer section 18 to the processor section 20 and is subjected to developing processing. As a result, a photographic print based on the image read by the color CCD scanner 14 is obtained.

On the other hand, the main scanning optical unit 22 provided at the laser printer section 18 modulates the laser beams of R, G, and B, which are emitted from the respective laser light sources 52 when signals in accordance with the image data are inputted to the AOMs 60 of the light source units 56 (more specifically, the AOM driver 96), based on the image data (density data) for the respective colors and sends the modulated laser beams toward the plane mirror 70.

The laser beams of the respective colors sent toward the plane mirror 70 are reflected by the plane mirror 70 toward the polygon mirror 76 and are reflected by the rotating polygon mirror 76 so as to scan in the main scanning direction. Subsequently, the laser beams are transmitted through the fθ lens 80 and the like and are reflected by the cylindrical mirror 84 and the reflecting mirror 86 toward the photographic printing paper 62. As a result, the laser beams expose the photographic printing paper 62 while scanning.

In order to mount the light source units 56 of R, G, and B (56R, 56G, and 56B) to the main scanning optical unit 22 provided at the exposure section 92 for effecting main scanning by the laser beams, assembly of each of the light source units 56 is first carried out. Hereinafter, the light source unit 56R will be described as an example.

In order to assemble the light source unit 56R, first, the laser light source 52R provided with the LD 144 is mounted to the supporting plate 146. The supporting plate 146 and the holder 140 to which the lens 138 is mounted are mounted to the mount 136. At this time, the positional relationship between the LD 144 and the lens 138 is adjusted.

Next, the mount 136 having the lens 138 and the laser light source 52R mounted thereto in the aforementioned manner and the collimator 148 are mounted to the base 134. At this time, the lens 138 and the laser light source 52R mounted to the mount 136 are regarded as a single optical element. This single optical element and the collimator 148 are positioned relatively to each other and are mounted to the base 134. In this way, the collimator lens 58 and the laser light source 52R are positioned relatively to each other and are mounted to the base 134.

Subsequently, the AOM 60, the collimator lens 58, and the laser light source 52R are mounted to the base 130. At this time, the collimator lens 58 and the laser light source 52R mounted to the base 134 are regarded as a single optical element. This single optical element and the AOM 60 are mounted to the base 130 while being positioned relatively to each other.

For example, the base 134 with the collimator lens 58 and the laser light source 52R mounted thereto is mounted to the base 130 at a predetermined position. Thereafter, the AOM 60 is mounted to the base 130 while the positional relationships between the mount 132 and the base 130, between the mount 132 and the AOM 60, and between the optical elements mounted to the base 134 and the AOM 60 are adjusted.

In other words, the two optical elements, i.e., the lens 138 and the laser light source 52R, are mounted to the mount 136 while the positional relationship between them is adjusted. The lens 138 and the laser light source 52R, which are mounted to the mount 136, are regarded as a single optical element, and this single optical element and the collimator 148 are mounted to the base 134 while the positional relationship between them is adjusted.

The collimator lens 58 and the laser light source 52R, which are mounted to the base 134, are regarded as a single optical element, and this single optical element and the AOM 60 are mounted to the base 130 while the positional relationship between them is adjusted.

Namely, between the laser light source 52R and the collimator lens 58, the mount 136 having the laser light source 52R and the lens 138 mounted thereto serves as a first base member, and the first base member and the collimator 148 are mounted to the base 134 serving as a second base member. Further, when the AOM 60 is mounted, the base 134 serves as a first base member, and the base 134 and the AOM 60 are mounted to the base 130 serving as a second base member.

By assembling the light source unit 56R in the aforementioned manner, when a plurality of optical elements, i.e., the laser light source 52R, the lens 138 and the collimator 148 forming the collimator lens 58, and the AOM 60, are mounted to the base 130 along the optical axis of the laser beam, adjustment of only the positional relationships between respective pairs of these optical elements is sufficient.

Consequently, for example, when the laser light source 52R, the collimator lens 58 and the AOM 60 are assembled, assembly is very easy compared with a case in which these optical elements are separately positioned on and mounted to the base portion 24A of the casing 24 or the base 130 mounted to the base portion 24A.

In other words, for example, in a method in which the laser light source 52R, the collimator lens 58 and the AOM 60 are directly mounted to the base 130, even if the positional relationship between any two of the optical elements is adjusted, when either of the two optical elements whose positional relationship has been already adjusted is moved at the time of adjusting the position of the remaining one optical element, the positions of the two optical elements whose positional relationship has been already adjusted are changed. As a result, the positional relationship between the two optical elements needs to be adjusted again.

In contrast, by regarding as a single optical element the plurality of optical elements whose positional relationship has already been adjusted and adjusting a positional relationship between the single optical element and another optical element, the positions of the optical elements whose positional relationship has already been adjusted are collectively adjusted. Therefore, there is no change in the positional relationship between the plurality of optical elements whose positional relationship has already been adjusted.

Moreover, since the laser light source 52R and the collimator lens 58 are provided on the base 134, when the base 130 or the like suffers an impact, for example, at least a change in the relative positions of the laser light source 52R and the collimator lens 58 can be prevented.

Further, in the light source unit 56R, not only the base 130 but also the base 132 and the mount 136 are formed of a member having a low thermal expansion rate. Thus, even if there are changes in temperature or the like, change in the positional relationship between the laser light source 52R, the collimator lens 58 (i.e., the lens 138 and the collimator 148), and the AOM 60 can be prevented.

With this structure, an image can be formed on the photographic printing paper 62 at high accuracy even in circumstances in which there are changes in temperature or the like.

In the first embodiment, the light source unit 56R has been described as an example. However, the present invention is not limited to the same. Hereinafter, as a second embodiment, the light source units 56G and 56B will be described as examples.

[Second Embodiment]

Figure 7:
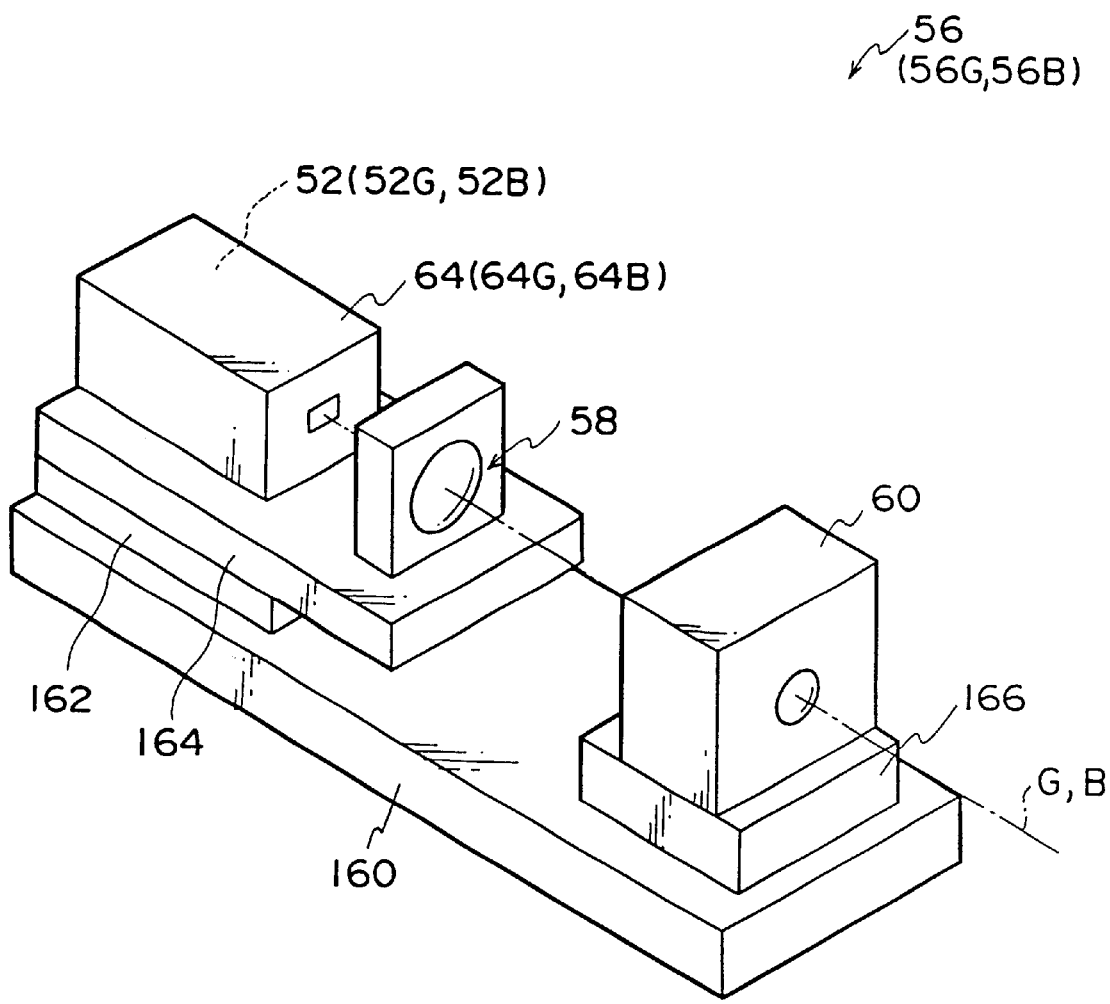
FIG. 7 is a perspective view schematically showing a light source unit relating to a second embodiment.

FIG. 7 schematically shows the structure of the light source units 56G and 56B to which the second embodiment is applied. In the second embodiment, the basic structure is the same as that of the first embodiment. Therefore, components of the second embodiment which are the same as those of the first embodiment are designated by the same reference numerals, and a detailed description thereof is omitted.

As shown in FIG. 7, the light source units 56G and 56B each have an elongated rectangle shaped base 160. An SHG module 64 (64G, 64B) and a collimator lens 58 which serves as a converging lens are mounted to this base 160 at one end thereof in the longitudinal direction, and the AOM 60 is mounted at the other end of the base 160.

A solid state laser, and an SHG serving as waveguides through which a laser beam emitted from the solid state laser passes are provided at each of the SHG modules 64G and 64B. The SHG module 64G provided at the light source unit 56G emits a laser beam having a wavelength of G (e.g., 532 nm), while the SHG module 64B provided at the light source unit 56B emits a laser beam having a wavelength of B (e.g., 475 nm), Conventionally known structures can be used as the SHG modules 64, and a detailed description thereof is omitted in the present embodiment.

Figure 8:
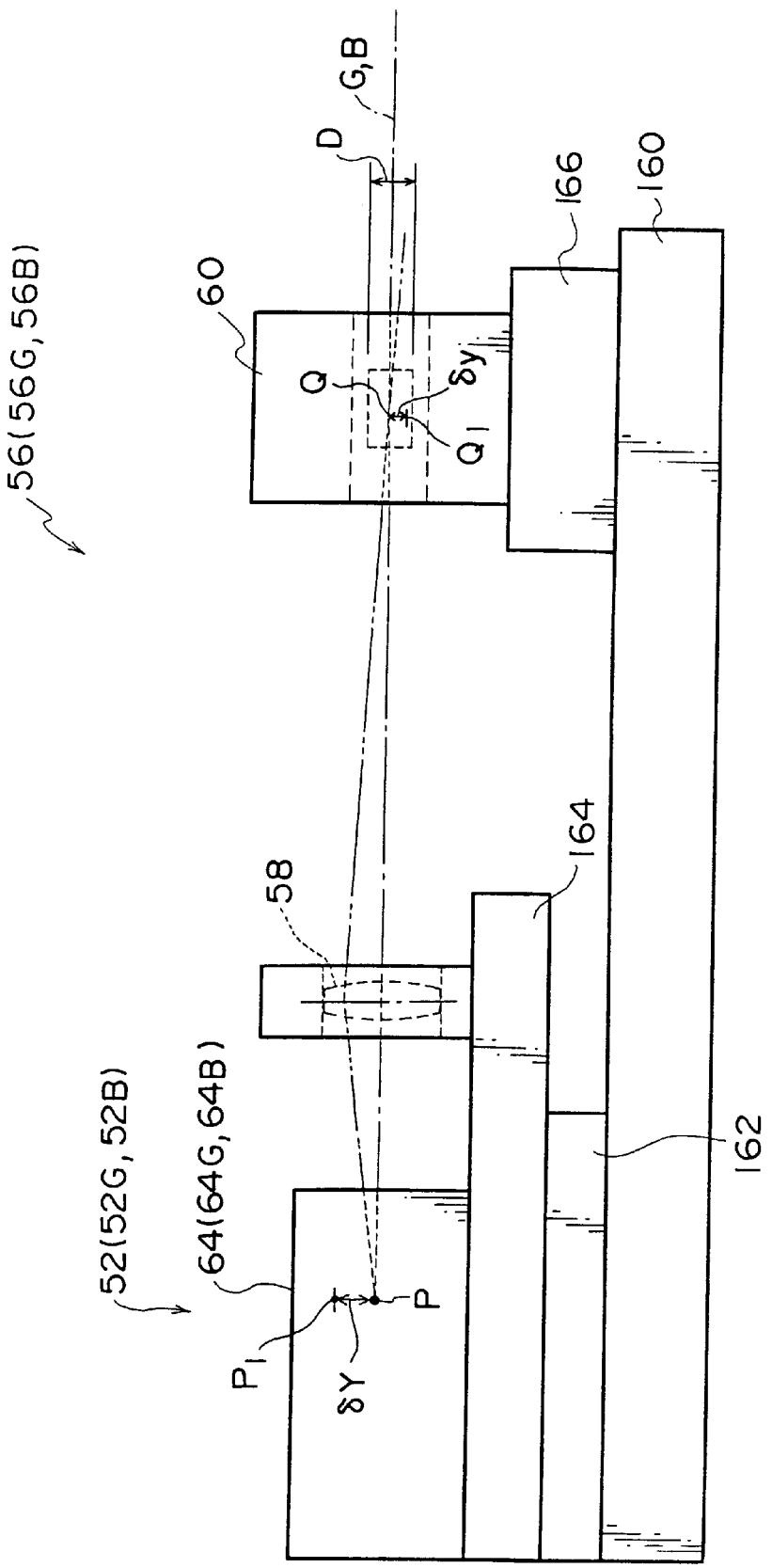
FIG. 8 is a schematic structural view of the light source unit relating to the second embodiment as seen from a direction orthogonal to the optical axis of a laser beam.

As shown in FIG. 8, the SHG module 64 emits a laser beam as diffused light. The collimator lens 58 converges this diffused light, and the light exits from the AOM 60 as a beam.

The SHG module 64 and the collimator lens 58 are mounted to a base 164 in such a manner that the distance between them is adjusted in advance. In other words, the SHG module 64 and the collimator lens 58 are assembled on the base 164 such that their optical axes coincide and the distance between them along the axial direction is adjusted.

In the light source unit 56 (56G, 56B), covar (FeNeCo) is used as the material for the base 164 on which the SHG module 64 and the collimator lens 58 are mounted. Covar has a very low linear expansion coefficient α, which is $10^{-5}$ $[K^{-1}]$ ($\alpha < 10^{-5}$ $[K^{-1}]$). Therefore, even when there are changes in temperature or the like, the distance between the SHG module 64 and the collimator lens 58 along the direction of the optical axes thereof is not easily changed.

The base 164 is mounted to the base 160 via an adjustment spacer 162. This adjustment spacer 162 is disposed at the SHG module 64 side of the base 164. In this way, in the light source unit 56, even when oscillation or the like is generated at the digital laboratory system 100, the SHG module 64 is prevented from being moved relative to the base 160 and from being oscillated.

Namely, the base 160 and the SHG module 64 are constructed to be oscillated together, thereby preventing the laser beam emitted from the SHG module 64 from fluctuating due to this oscillation. If relative oscillation of the SHG module 64 with respect to the base 160 and the like is prevented by using other methods, the adjustment spacer 162 is preferably mounted on the base 160 at a position corresponding to the central portion of the base 164 or at a position toward the collimator lens 58.

In the light unit 56, the SHG module 64 and the collimator lens 58 which have been mounted on the base 164 are regarded as a single optical element, and this single optical element is mounted onto the base 160 after the positional relationship between this single optical element and the AOM 60 has been adjusted. That is, as shown in FIG. 8, the AOM 60 is mounted on a mount 166 in such a manner that the height of the AOM 60 is adjusted by the mount 166 such that the optical axis of the AOM 60 coincides with the optical axis of the collimator lens 58. Further, the AOM 60 is mounted on the mount 166 such that the distance between the collimator lens 56 and the AOM 60 along the direction of their optical axes corresponds to the focal length and the like of the collimator lens 56.

With the above structure, in the light. source unit 56 (56G, 56B), given that the lateral magnification by the collimator lens 58 between a light emission point P within the SHG module 64 and a converging point Q within the AOM 60 is β, and that the effective aperture width of the AOM 60, which is the region where the laser beam is diffracted, is D, the amount of change δY in the relative positions of the light emission point P and the collimator lens 58 in the direction perpendicular to the optical axes, which change is caused by a change in temperature or the like, can be expressed by: $\delta Y \leq D/(2\beta)$.

In the light source units 56G and 56B assembled in the aforementioned manner, the laser beam emitted from the SHG module 64 is reliably converged within a predetermined region in the AOM 60 so that the laser beam is accurately modulated on the basis of image data.

In general, when there are changes in temperature or the like or when an impact is applied, changes in the positional relationship between the SHG module 64 and the collimator lens 58 are likely to occur, not only along the axial direction but also along the direction orthogonal to the axial direction. At this time, if the change in the positional relationship between the SHG module 64 and the collimator lens 58 along the direction orthogonal to the axial direction becomes considerable, the position of the AOM 60 onto which the laser beam is irradiated is moved in the vertical direction. Therefore, if the position to be irradiated by the laser beam is out of the region where the laser beam can be modulated, modulation of the laser beam at the AOM 60 becomes impossible.

Moreover, since the base 160 is formed in an elongated rectangle shape, if the SHG module 64, the collimator lens 58, and the AOM 60 are separately mounted on the base 160, the base 160 is susceptible to flexure. Such flexure at the base 160 causes great changes in the positions of the axes of the SHG module 64 and the collimator lens 58. Such changes in the positions of the axes of the SHG module 64 and the collimator lens 58 lead to a change in the relative positions of the SHG module 64 and the collimator lens 58 in the direction orthogonal to their axes. As a result, the laser beam no longer falls within the predetermined region of the AOM 60.

In contrast, in the light source unit 56 (56G, 56B) to which the present second embodiment is applied, the base 164 which is shorter than the base 160 is separately provided, and the SHG module 64 and the collimator lens 58 are mounted on this base 164. Therefore, in the light source unit 56, even if the base 160 flexes, there is no change in the relative positions of the axes of the SHG module 64 and the collimator lens 58. Further, in the light source unit 56, even if the base 164 flexes, the change in the relative positions of the axes of the SHG module 64 and the collimator lens 58 is small.

In this way, in the light source unit 56, the amount of change δY in the relative positions of the light emission point P in the SHG module 64 and the collimator lens 58 along the direction perpendicular to the optical axes can be expressed by: $\delta Y \leq D/(2\beta)$.

Namely, as shown in FIG. 8, when the change in the relative positions of the light emission point P in the SHG module 64 and the collimator lens 58 occurs in the direction perpendicular to the optical axes, the light emission point P becomes a point $P_1$ relative to the collimator lens 58, and the converging point Q in the AOM 60 becomes a point $Q_1$ relative to the collimator lens 58. At this time, the amount of change δY between the light emission point P and the point $P_1$ relative to the collimator lens 58, and the amount of change δy between the converging point Q and the point $Q_1$ relative to the collimator lens 58 have the following relationship: $\delta y = \beta \cdot \delta Y$. Since the laser beam only needs to pass through the AOM 60 within the effective aperture width D, the amount of change δy can be expressed by: $\delta y \leq D/2$. Therefore, the amount of change δY can be expressed by: $\delta Y \leq D/(2\beta)$.

Accordingly, as long as the amount of change δY in the relative positions of the collimator lens 58 and the light emission point P in the SHG module 64 falls within the range expressed by the above formula, the laser beam can be appropriately irradiated onto the predetermined region in the AOM 60.

Further, in the light source unit 56, due to the base 164, on which the SHG module 64 and the collimator lens 58 are mounted, being formed of covar which is a material having a low linear expansion coefficient, not only when an impact is applied to the base 160 and the like of the light source unit 56, but also even when changes in temperature or the like are caused, a change in the distance between the SHG module 64 and the collimator lens 58 in the axial direction can be prevented.

Accordingly, in the light source unit 56, not only is adjustment easy at the time of assembly, but also, even when an impact is applied at the time of assembly or changes in temperature or the like are caused after assembly, a laser beam appropriately modulated at the AOM 60 can be emitted from the AOM 60 so that high-quality images can be formed on recording materials such as the photographic printing paper 62.

In the present second embodiment, covar is used as the material forming the base 164 which is the first base member. However, the material from which the base 164 is formed is not limited to this material, and any material can be used as long as its linear expansion coefficient α is less than $10^{-5}$ $[K^{-1}]$ (i.e., $\alpha < 10^{-5}$ $[K^{-1}]$). Further, the base 160 can also be formed of a material having a low linear expansion coefficient such as covar or the like.

Moreover, the embodiments described above are not intended to limit the structure of the present invention. In the embodiments, a description has been given in which the present invention has been applied to the main scanning optical unit 22 provided at the laser printer section 18 of the digital laboratory system 10. However, the present invention can be applied to an optical system for scanning having any structure which is formed by positioning a plurality of optical elements at predetermined positions.

Further, in the embodiments, the optical system for scanning has been described as one which carries out exposure by using laser beams of various colors of R, G, and B. However, an optical system for scanning to which the present invention is applied can use laser beams having a single wavelength.

Furthermore, the application of the present invention is not limited to an optical system for scanning which forms an image on a photographic photosensitive material such as a photographic printing paper. The present invention can also be applied to an optical system for scanning which forms an image on any recording medium such as a photosensitive drum by scan exposure.

As described above, in accordance with the present invention, an excellent effect can be achieved in that adjustment of positional relationships between a number of optical elements and assembly of the optical elements can be carried out easily and reliably by repeatedly adjusting positional relationships between two optical elements.

Further, in the present invention, the first base member in particular is formed of a material having a low linear expansion coefficient such as covar or the like. Therefore, even when there are changes in temperature or the like, a change in the relative positions of the optical elements can be prevented, and appropriate images can be formed on recording materials.

What is claimed is:

1. An optical system for scanning in which a laser beam emitted from a laser light source is modulated by an external modulator, which is provided as one of a plurality of optical elements, in accordance with an image to be recorded on a recording medium and is subsequently deflected in a main scanning direction by main scanning deflection means so as to scan and expose the recording medium, said optical system for scanning comprising:

a first base member to which at least two optical elements sequentially disposed along an optical axis of the laser beam are mounted after the positional relationship between them is adjusted; and a second base member to which said external modulator, which is disposed adjacent along the optical axis to the optical elements mounted to said first base member, is mounted after the positional relationship between said external modulator and a single optical element is adjusted, said first base member and said at least two optical elements being the single optical element.

2. An optical system for scanning according to claim 1, wherein the laser light source, and a converging lens for converging the laser beam emitted from the laser light source are assembled, as the optical elements, on said first base member.

3. An optical system for scanning according to claim 2, wherein the laser light source is formed by a solid state laser and a wavelength conversion element.

4. An optical system for scanning according to claim 2, wherein the converging lens has a function of adjusting a position to be irradiated by the laser beam, which position falls within a predetermined range of a plane perpendicular to the optical axis of the laser beam.

5. An optical system for scanning in which a laser beam emitted from a laser light source is modulated by an external modulator, which is provided as one of a plurality of optical elements, in accordance with an image to be recorded on a recording medium and is subsequently deflected in a main scanning direction by main scanning deflection means so as to scan and expose the recording medium, said optical system for scanning comprising:

a first base member to which at least two optical elements sequentially disposed along an optical axis of the laser beam are mounted after the positional relationship between them is adjusted; and a second base member to which another optical element, which is disposed adjacent along the optical axis to the optical elements mounted to said first base member, is mounted after the positional relationship between said another optical element and a single optical element is adjusted, said first base member and said at least two optical elements being the single optical element, wherein the external modulator is an acoustooptic modulation element.

6. An optical system for scanning in which a laser beam emitted from a laser light source is modulated by an external modulator, which is provided as one of a plurality of optical elements, in accordance with an image to be recorded on a recording medium and is subsequently deflected in a main scanning direction by main scanning deflection means so as to scan and expose the recording medium, said optical system for scanning comprising:

a first base member to which at least two optical elements sequentially disposed along an optical axis of the laser beam are mounted after the positional relationship between them is adjusted; and a second base member to which another optical element, which is disposed adjacent along the optical axis to the optical elements mounted to said first base member, is mounted after the positional relationship between said another optical element and a single optical element is adjusted, said first base member and said at least two optical elements being the single optical element, wherein said first base member is formed of a material having a linear expansion coefficient $\alpha$ of $\alpha<10^{-5}$ $[K^{-1}]$.

7. An optical system for scanning according to claim 6, wherein said first base member is formed of covar.

* * * * *